(12) United States Patent
Venkatesh et al.

(10) Patent No.: US 10,599,356 B2
(45) Date of Patent: Mar. 24, 2020

(54) AGGREGATING MEMORY TO CREATE A NETWORK ADDRESSABLE STORAGE VOLUME FOR STORING VIRTUAL MACHINE FILES

(71) Applicants: ATLANTIS COMPUTING, INC., Sunnyvale, CA (US); Chetan Venkatesh, San Mateo, CA (US); Jin Liu, Sunnyvale, CA (US); Qian Zhang, Sunnyvale, CA (US); Pu Paul Zhang, San Jose, CA (US)

(72) Inventors: Chetan Venkatesh, San Mateo, CA (US); Jin Liu, Sunnyvale, CA (US); Qian Zhang, Sunnyvale, CA (US); Pu Paul Zhang, San Jose, CA (US)

(73) Assignee: HIVEIO INC., Hoboken, NJ (US)

( * ) Notice: Subject to any disclaimer, the term of this patent is extended or adjusted under 35 U.S.C. 154(b) by 144 days.

(21) Appl. No.: 15/514,816

(22) PCT Filed: Feb. 10, 2015

(86) PCT No.: PCT/US2015/015285
§ 371 (c)(1),
(2) Date: Mar. 27, 2017

(87) PCT Pub. No.: WO2015/123225
PCT Pub. Date: Aug. 20, 2015

(65) Prior Publication Data
US 2017/0262214 A1    Sep. 14, 2017

Related U.S. Application Data

(60) Provisional application No. 61/938,487, filed on Feb. 11, 2014.

(51) Int. Cl.
*G06F 3/06* (2006.01)
*G06F 9/455* (2018.01)
*G06F 11/16* (2006.01)

(52) U.S. Cl.
CPC .......... *G06F 3/0644* (2013.01); *G06F 3/0604* (2013.01); *G06F 3/067* (2013.01);
(Continued)

(58) Field of Classification Search
CPC .... G06F 3/0604; G06F 3/0631; G06F 3/0644; G06F 3/0664; G06F 3/0665; G06F 3/067
See application file for complete search history.

(56) References Cited

U.S. PATENT DOCUMENTS 8,312,201 B2 * 11/2012 Fleming ................ G06F 12/023
711/135
8,621,178 B1 * 12/2013 Lazar .................. G06F 12/0223
711/117

(Continued)

FOREIGN PATENT DOCUMENTS

EP          0734554 51         7/1999

OTHER PUBLICATIONS

PCT Notification of Transmittal of The International Search Report and The Written Opinion of the International Search Authority, or The Declaration for PCT Counterpart Application No. PCT/US2015/015285 Containing International Search Report, 11pgs. (dated May 14, 2015).

(Continued)

*Primary Examiner* — Hal Schnee
(74) *Attorney, Agent, or Firm* — Womble Bond Dickinson (US) LLP

(57) ABSTRACT

A method and apparatus for utilizing virtual machines to pool memory from disparate server systems that may have disparate types of memory is described. The method may (Continued)

include establishing communication between a pool virtual machine and two or more publisher virtual machines. The method may also include aggregating, by the pool virtual machine, portions of memory from each of two or more publisher servers to generate a pool of memory, and providing an application with access to the pool of memory, through the pool virtual machine.

23 Claims, 6 Drawing Sheets

(52) U.S. Cl.
CPC ........ *G06F 3/0664* (2013.01); *G06F 9/45558* (2013.01); *G06F 11/1666* (2013.01); *G06F 2009/45583* (2013.01); *G06F 2201/815* (2013.01)

(56) References Cited

U.S. PATENT DOCUMENTS

| | | | |
|---|---|---|---|
| 2007/0113007 A1* | 5/2007 | Murayama | G06F 3/0608 711/114 |
| 2008/0155223 A1 | 6/2008 | Hiltgen et al. | |
| 2009/0210875 A1* | 8/2009 | Bolles | G06F 3/0608 718/1 |
| 2009/0262703 A1 | 10/2009 | Khetawat et al. | |
| 2009/0276771 A1 | 11/2009 | Nickolov et al. | |
| 2011/0184993 A1 | 7/2011 | Chawla et al. | |
| 2011/0264856 A1* | 10/2011 | Breda | G06F 3/0605 711/114 |
| 2012/0272244 A1 | 10/2012 | Bozek et al. | |
| 2013/0019071 A1* | 1/2013 | Lewis | G06F 3/0607 711/154 |
| 2013/0060946 A1 | 3/2013 | Kenneth et al. | |
| 2013/0073702 A1* | 3/2013 | Umbehocker | G06F 9/5016 709/222 |
| 2013/0073730 A1 | 3/2013 | Hansson et al. | |
| 2013/0204960 A1* | 8/2013 | Ashok | G06F 15/17 709/213 |
| 2013/0246552 A1* | 9/2013 | Underwood | G06F 15/167 709/212 |
| 2013/0282994 A1* | 10/2013 | Wires | G06F 3/0604 711/158 |
| 2014/0047201 A1* | 2/2014 | Mehta | G06F 13/00 711/158 |
| 2014/0201308 A1* | 7/2014 | Rhea | H04L 65/60 709/213 |
| 2014/0223098 A1* | 8/2014 | Lee | G06F 9/5016 711/118 |
| 2015/0201017 A1* | 7/2015 | Hrischuk | H04L 67/1097 709/226 |
| 2015/0324145 A1* | 11/2015 | Akutsu | G06F 3/0617 711/114 |

OTHER PUBLICATIONS

PCT International Preliminary Report on Patentability for PCT Application No. PCT/US2015/015285, 9 pgs. (dated Aug. 25, 2016).

* cited by examiner

POOL PROTOCOL REQUEST MESSAGE

| MSG SIGNALING ID 602 | MSG TYPE 604 | MSG HANDLE 606 | OFFSET 608 | LENGTH 610 | PAYLOAD 612 |

POOL PROTOCOL REPLY MESSAGE

| MSG SIGNALING ID 652 | ERROR CODE 654 | MSG HANDLE 656 | PAYLOAD 658 |

AGGREGATING MEMORY TO CREATE A NETWORK ADDRESSABLE STORAGE VOLUME FOR STORING VIRTUAL MACHINE FILES

CROSS-REFERENCE TO RELATED APPLICATIONS

The present application is a U.S. National Phase Application under 35 U.S.C. 371 of International Application No. PCT/US2015/015285, filed Feb. 10, 2015, which claims priority to U.S. Provisional Application Ser. No. 61/938,487, filed Feb. 11, 2014, and incorporates that application in its entirety.

TECHNICAL FIELD

Embodiments of the invention relate to the field of data storage, and more particularly, to utilizing virtual machines to pool memory.

BACKGROUND

The use of virtualized server environments has grown rapidly, and accordingly, the storage requirements needed to back the virtualized server environments have also grown rapidly. One solution to meeting the increased storage needs for the virtualized server environments is to simply purchase more storage capacity, This solution, however, can be very expensive.

Furthermore, this solution does not address the further complication that memory is often purchased for individual software applications run in the virtualized server environments. The purchased memory for a specific application is thereafter separated and isolated from use by other applications. As a result, the total available memory in the virtualized server environments is often fragmented, thereby creating inefficient silos in the available server memories.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus is disclosed herein for utilizing virtual machines to pool memory from disparate server systems that may have disparate types of memory. As discussed herein, virtual machines executed by hypervisors are utilized to convert server memory, such as Random Access Memory (RAM), into a storage resource. In one embodiment, a pool virtual machine executed on a pool server interacts with a plurality of publisher virtual machines executed on a plurality of publisher servers to generate a memory pool from resources available at the publisher servers. In one embodiment, each publisher server allocates a portion of its memory, such as server RAM, for use by the memory pool. The pool virtual machine then tracks the combined portions of memory available at the publisher servers to create the pooled memory. The pool server may then act as a network addressable storage volume for one or more applications, by managing access to data files stored in the pooled memory. In one embodiment, pool virtual machine pools and/or optimizes the class of storage, type of storage, and amount of storage pooled for the one or more applications.

Figure 1:
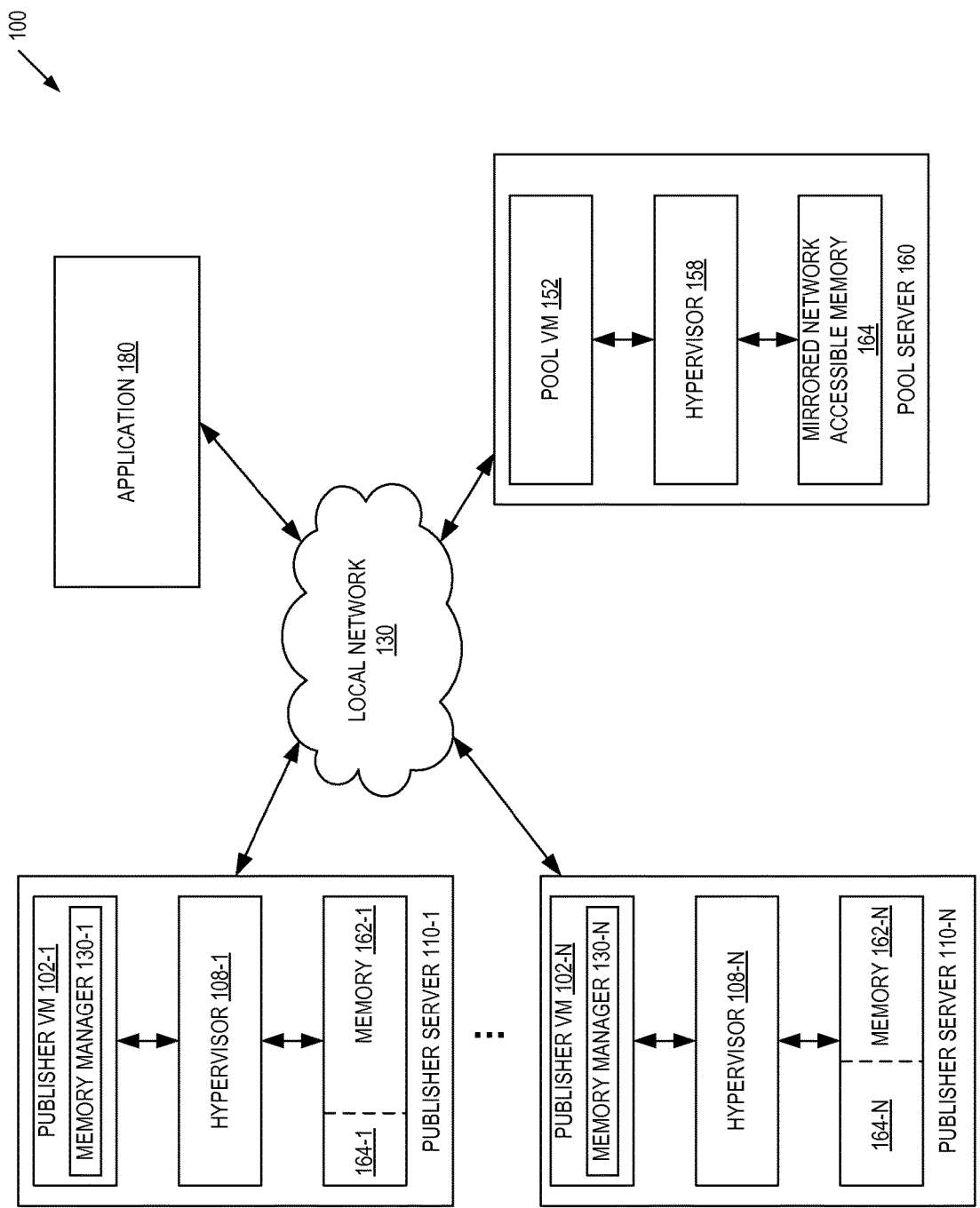
FIG. 1 is a block diagram of exemplary system architecture for enabling a network addressable storage volume for storing virtual machine files in an aggregated pool of memory.

FIG. 1 is a block diagram of exemplary system architecture for enabling a network addressable storage volume for storing virtual machine ("VM") files in an aggregated pool of memory. In one embodiment, the system 100 includes at least two publisher servers 110-1 through 110-N, and in one embodiment each publisher server provides a virtualized computing environment that executes publisher virtual machines 102-1 through 102-N. The system 100 further includes a pool server 160, which also provides a virtualized computing environment that executes a pool virtual machine 152. The system in one embodiment also includes an application 180, which accesses an aggregated pool of memory provided as a virtualized storage volume managed by pool server 160.

The publisher servers 110-1 through 110-N, pool server 160, and application 180 are communicatively coupled to network 130 to enable communication between, for example, application 180 and pool server 160, and between pool server 160 and publisher servers 110-1 through 110-N. In one embodiment, network 130 enables communication using any of the standard protocols for the exchange of information. In one embodiment, some of the servers and/or applications may be coupled to the pool via a different network. However, each of the publisher servers 110-1 through 110-N and applications 180 is coupled to pool server 160.

In one embodiment, the publisher servers 110-1 through 110-N and pool server 160 may run on one Local Area Network (LAN), may be incorporated into the same physical or logical system, or may be different physical or logical systems. In one embodiment, publisher servers 110-1 through 110-N and pool server 160 reside within the same data center while being communicatively coupled to the same LAN. In one embodiment, the application 180 may run on the same LAN, a different LAN, a wide area network, etc., and may be coupled to the pool server 160 via a public network such as the Internet, separated by firewalls, routers, and/or other network devices. It should be noted that various other network configurations can be used including, for example, hosted configurations, distributed configurations, centralized configurations, etc. In one embodiment, the publisher servers 110-1 through 110-N may be linked to pool server 160 via a wired network.

In one embodiment, the virtualized computing environments of publisher servers 110-1 through 110-N and pool server 160 includes virtual machines, such as publisher virtual machines 102-1 through 102-N and pool virtual machine 152, hypervisors 108-1 through 108-N and hypervisor 158, and memory 162-1 through 162-N and memory 164. In one embodiment, the memory may include a cache memory that utilizes server FLASH memory, or other types of high speed RAM. The memory may also include a primary storage. Furthermore, in one embodiment, virtual machines 102-1 through 102-N and pool virtual machine 152 run alongside existing virtual applications on publisher servers 110-1 through 110-N and pool server 160.

The number, type, configuration, topology, connections, or other aspects of publisher systems and pool system may be varied and are not limited to the examples shown and described. In one embodiment, the publisher virtual machines 102-1 through 102-N and pool virtual machine 152 are special purpose virtualized machine applications running on various types of hardware, software, circuitry, or a combination thereof (e.g., x86 servers) that are managed by a hypervisor, such as hypervisors 108-1 through 108-N and hypervisor 158.

Although not shown, in one embodiment, each server may include a deduplication application that may be used to deduplicate data to be written to memory. In one embodiment, the deduplication applications remove duplicate information in VM files in the write path of the virtualized computing environments (i.e., Virtual Desktop Infrastructure ("VDI")/Hosted Virtual Desktop ("HVD")), as well as in the write path to the aggregated pool of memory. Duplicate information is any block information that is already stored in a primary storage, from a prior copy of the same data or from a different data set. Examples of techniques used in deduplication of virtual machine files are described in co-pending U.S. patent application Ser. No. 13/269,525, filed Oct. 7, 2011, entitled "Deduplication of Virtual Machine Files in a Virtualized Desktop Environment," which is incorporated herein in its entirety. Furthermore, each server may include one or more additional memory optimization applications, such as input/output processing applications that process I/O operations in real-time at a compute layer to lower latency and reduce network traffic between the servers, real-time or near real-time compression applications that compresses data blocks stored in memory, data coalescing applications that coalesces small random blocks generated by hypervisors into larger sequential blocks to great improve storage access and efficiency, thin provisioning applications, fast virtual machine cloning applications, as well as other applications to optimize existing storage systems.

The application 180 may be a virtual machine based application that utilizes pool server 160 as a storage volume for storing one or more of the application's 180 virtual machine files, such as VM disk files, VM configuration files, and other data relevant to the application 180. Examples of applications that may be utilized with the aggregated memory pools as discussed herein include applications that utilize virtualized servers, such as database applications, mail applications, big data applications, collaboration applications, test and development applications, and any other business applications that consume virtualized server workloads and storage. In one embodiment, application 180 connects with a virtual memory pool generated by pool VM 152 on pool server 160 as a standard network file system (NFS) or an internet small computer system interface (iSCSI) data store, to preserve existing virtual machine or server workflows on the pool server 160.

In one embodiment, pool VM 152 aggregates portions of memory 162-1 through 162-N, such as random access memory (RAM) available at publisher servers 110-1 through 110-N, to create a memory pool that may be utilized by the application 180. In one embodiment, pool VM 152 maintains cache of frequently or recently accessed data in memory 164, and provides a minor of the pool of memory available at the publisher servers 110-1 through 110-N. The application 180 thereafter accesses data via the local memory provided by pool server 160, or via the aggregated memory pool through the pool server 160, as discussed below.

In one embodiment, each publisher server 110-1 through 110-N includes memory manager software 130-1 through 130-N to export a portion of the memory available on that publisher server. The term "export" as used here means that memory is made available to the pool server 160, and is reserved from the publisher server's own use. For example, publisher VM 102-1 may export the portion 164-1 of memory 162-1 to the memory pool created and managed by pool VM 152. Furthermore, publisher VM 102-N may also export a portion 164-N of memory 162-N to the memory pool created and managed by pool VM 152. In one embodiment, the portion of memory exported by each publisher VM may be a different size.

The class of memory—such Storage Area Network (SAN) memory, Network Attached Storage (NAS) memory, or Random Access Memory (RAM)—and the type of memory—such as Solid State Device (SSD) memory, FLASH memory, or other forms of memory—can be different at different publisher servers. In one embodiment, pool VM 160 can pool disparate forms of memory available at disparate publisher servers to create a hybrid memory pool of disparate memory types. In another embodiment, pool VM 160 can pool similar types of memory to generate a larger volume of the same type of memory, such as FLASH or RAM, from the disparate publisher servers. In either scenario, existing resources available at disparate servers, such as servers in the same data center, can be pooled for more efficient use.

In one embodiment, each publisher VM, such as VMs 102-1 through 102-N receives and/or negotiates a set of configurations with pool VM 152 when any of publisher servers 110-1 through 110-N are powered on or the export software is initiated. In one embodiment, the set of configurations specify how much memory from a particular publisher server is to be collected and published to the aggregated memory pool created and managed by pool VM 152, protocol options that specify a type and class of memory provided by the publisher server, as well as other server configuration options. In one embodiment, once a publisher VM allocates a portion of memory, the allocated memory is exposed to pool VM 152 as a network addressable block storage device (i.e., a device that moves around, or otherwise exchanges, blocks of data). In one embodiment, each publisher VM 102-1 through 102-N that is part of a cluster of publisher VMs managed by pool VM provides some portion of memory to the aggregated memory pool as a server process executed by the publisher VM on each publisher server. In another embodiment, a subset of VMs may not provide memory. A memory pool includes memory from at least two VMs.

In one embodiment, pool VM 152 can access blocks of memory from each exported portion of memory provided by the publisher servers via a client process executed by the pool VM 152 on pool server 160. In one embodiment, pool VM 152 provides a virtualized storage volume to application 180 so that application 180 can read and write data on the pool server 160. In one embodiment, pool server 160 acts as a write-back device in which memory block read and write requests are served by memory 164 of the pool server 160, which acts as a cache memory to the aggregated pool of memory, and cached memory is committed to the aggregated memory pool at a later time. The aggregated memory pool is therefore a primary storage for the application, as well as a primary storage for the deduplication application discussed above. In another embodiment, pool server 160 does not maintain blocks of application's 180 data in a local memory, and instead pool server 160 acts as a block device that serves memory requests, such as READ and WRITE requests, directly from the aggregated pool of memory. In this embodiment, the aggregated pool of memory exposed by the publisher server's act as a caching tier for READ requests, and a buffer for the WRITE requests.

In one embodiment, a client process of the pool VM 152 accesses the portions of memory on a publisher server 110 by sending a pool protocol request message to a server process of the corresponding publisher VM 102. In response, the server process of the publisher VM 102 sends the client process of the pool VM 152 a reply message. One embodiment of the format of pool protocol request and reply messages are illustrated in FIGS. 6A and 6B.

Figure 6A:
FIG. 6A illustrates an exemplary pool protocol request message.
Figure 6B:
FIG. 6B illustrates an exemplary pool protocol response message.

FIG. 6A illustrates an exemplary pool protocol request message 600. In the illustrated embodiment, the message includes a header with a message signaling ID field 602, a message type field 604, a message handle field 606, an offset 608, and a length field 610. The message also includes a body with a payload 612. In one embodiment, the message signaling ID field 602 in a header of a request message includes a 32-bit number, which is an in-band signal to the publisher VM from the pool VM that identifies the data, format, type, etc. which is the subject of the request message 600.

In one embodiment, the message type field 604 in the message header is a 32-bit field that specifies the message type, such as a READ message for reading a certain amount of data, WRITE message for writing a certain amount of data, a DISCONNECT message for disconnecting from a server, or a FLUSH message for flushing data to server memory. Other types of message types may be utilized, as well.

The message handle 606 in the request message header is a 64-bit handle that abstracts a reference to data at the message recipient system. The offset 606 specifies a 64-bit offset "from" the base of the reserved memory. The length 610 is a 32-bit value that specifies the length of the payload 612. In the case of a WRITE message, the header is immediately followed by "length" bytes of data to be written to memory. In the case of a FLUSH message, in one embodiment the offset 606 and length 610 fields of the message header are zero, which signals that an entire buffer should be flushed. Other flush values may be used for flushing specific areas without a write.

Furthermore, bits 16 and above of the commands can be reserved for flags to be included in a request message. In the case of a DISCONNECT message, the recipient publisher server will immediately close its connection with the pool server. In one embodiment, such requests can be handled synchronously. In another embodiment, such disconnect requests can be handled asynchronously, and postponed until there are no other memory requests pending at the server.

An exemplary reply message 650 generated by a publisher VM is illustrated in FIG. 6B. In one embodiment, the reply message 650 includes a header with a message signaling ID 652, an error code 654, and a message handle 656. After the reply message header, the message may include a payload 658. In one embodiment, the message signaling ID field 652 also includes a 32-bit number that provides in-band signaling to the pool VM 160. The error code field is a 32-bit field that specifies a "0" when no error occurred in executing the last request on a publisher server, or an error code corresponding to a specific error type when an error occurred, such as a read failure, write, failure, timeout, etc. In one embodiment, the message handle field 656 is the same message handle 606 of the corresponding request message. In the case where a reply message is sent to a pool VM in response to a read request, and the error field is zero, the reply message 650 header is immediately followed by length 610 bytes of data.

The embodiments of the request and response messages above are illustrative, as fields may be added, omitted, rearranged, resized, etc.

Returning to FIG. 1, in one embodiment, pool VM 152 tracks the location of blocks of data exchanged in response to the request and reply messages from the disparate publisher servers 110, by generating and maintaining a memory management table of which publisher server stores which data, and where. In one embodiment, pool VM 152 provides a mirror of a subset of the data available at the allocated portions of the pool of publisher servers. In one embodiment, pool VM 152 may provide for data storage redundancy or high availability by distributing multiple copies of the same block of data to multiple publisher VMs. In one embodiment, the memory management table generated by pool VM 152 is utilized to manage the distribution of blocks of data, data redundancy, handling of read and/or write requests, etc.

In one embodiment, pool VM 152 may generate different memory pools for different applications in response to policy considerations or application requirements. In one embodiment, a definition of one or more storage policies can be provided to pool VM 152 when pool VM 152 generates a memory pool to define the policies for that memory pool. In one embodiment, an application, such as application 180, can specify either application requirements or policy-based controls prior to accessing a virtualized storage volume, to enable creation of a policy-based pool by VM 152. In another embodiment, an administration user interface, such as that provided to a system administrator, can be used to specify one or more policy-based controls for a memory pool.

In one embodiment, a policy based memory pool can be automatically selected for an application based on the type of application, one or more application requirements, or other factors associated with the application. In one embodiment, the automatic selection of a policy-based memory pool optimizes one or more of storage capacity, storage performance characteristics, and availability based on the application's requirements and/or needs. Furthermore, policy-based memory pools may be generated for different applications based on the individual application's workload and requirements to ensure that each application's needs are met, while optimizing storage utilization across the publisher servers 110-1 through 110-N. For example, a virtualized application that has substantial real-time computational requirements may utilize a certain policy-based memory pool, which is different from a policy-based memory pool utilized by other applications. The utilization of different policy based memory pools enables storage centers to lower costs, achieve better performance, and increase flexibility of the existing storage resources.

In one embodiment, the policy-based controls used by pool VM 152 can include types of storage characteristics required by an application. In one embodiment, pool VM 152 can then utilize the storage characteristics to either generate a new policy-based memory pool from publisher servers 110-1 through 110-N that satisfies the policy-based controls, or provide access to an existing policy-based memory pool that has already been created from publisher servers 110-1 through 110-N with the desired storage characteristics. In one embodiment, the storage characteristics that may be specified in a storage policy for a policy based memory pool include:

Hybrid storage characteristics that specify use of server RAM and existing SAN or NAS storage to increase performance and increase the number of virtual machines supported by the policy based memory pool;

Converged storage characteristics that specify use of a combination of server RAM, Flash, SAS or SATA to create an integrated storage and computing platform provided with the policy based memory pool;

Homogeneous storage characteristics that specify a type of memory, such as a specification to use any combination of shared and local Flash memory to increase flash storage capacity in a policy based memory pool; and Redundancy characteristics that utilize RAM-based storage which is then replicated to shared storage in a memory pool, or which specify redundancy within server RAM for a memory pool.

Figure 2:
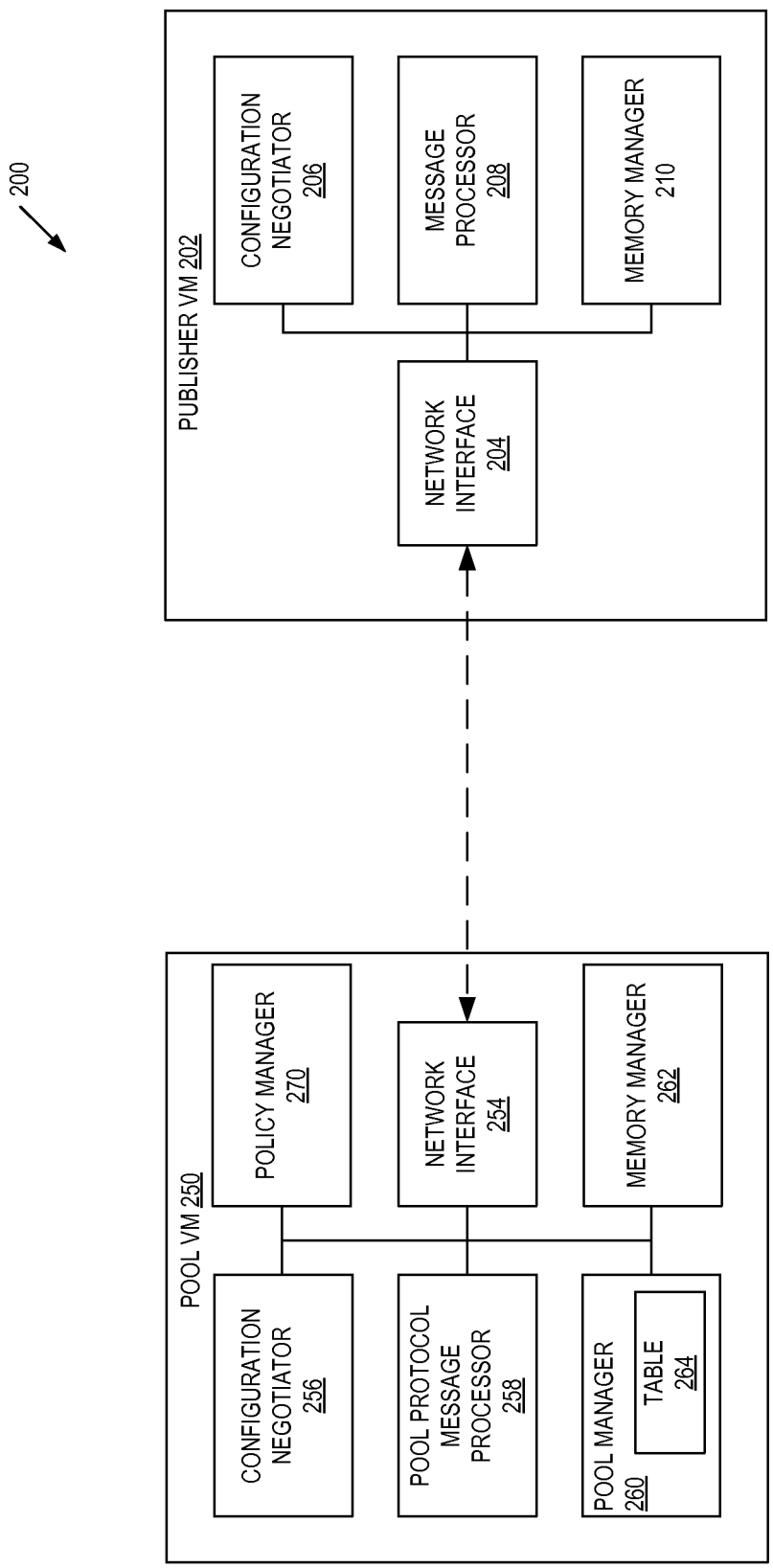
FIG. 2 is a block diagram of one embodiment of a pool virtual machine and a publisher virtual machine.

FIG. 2 is a block diagram of one embodiment of a pool virtual machine 250 and an exemplary publisher virtual machine 202. Pool virtual machine 250 and a publisher virtual machine 202 provide additional details for the pool VM and publisher VMs discussed above in FIG. 1. As noted above, a pool VM 250 is executed by a pool server, and would generally be coupled to two or more publisher servers, which would include a plurality of publisher VMs 202, but for simplicity only one publisher VM 202 is illustrated here and the pool server and publisher server are not shown.

In one embodiment, pool VM 250 includes a number of processing modules, which may be implemented as hardware, software, firmware, or a combination, such as network interface 254, configuration negotiator 256, pool protocol message processor 256, pool manager 260, policy manager 270, and memory manager 262 which includes memory management table 264. Publisher VM 202 similarly includes a number of processing modules, which may be implemented as hardware, software, firmware, or a combination, such as network interface 204, configuration negotiator 206, message processor 206, and memory manager 210.

In one embodiment, aggregation of a pool of memory at disparate server systems that may have disparate memory types begins in response to publisher VM 202 being powered on, or being installed for the first time, on a publisher server (not shown). In one embodiment, configuration negotiator 206 detects the powering on, and starting up, of publisher VM 202, and searches a network for an address associated with pool VM 250. Once VM configuration negotiator 206 finds pool VM 250, VM configuration negotiator 206 initiates communication with pool configuration negotiator 256 of pool VM 250.

In one embodiment, configuration negotiators 256 and 206 communicate with one another in a handshake process in which the size of the RAM or other storage capacity to be exported by a publisher server, is provided to the memory pool managed by pool VM 250. In one embodiment, other protocol options are negotiated, such as the type and class of storage available at the publisher VM 202, policy based storage options, usage options, etc.

In one embodiment, where one or more storage policies are utilized in the generation of a memory pool, policy manager 270 provides the specified policy based storage characteristics, such as hybrid storage policies, converged storage policies, homogeneous storage policies, redundancy policies, etc., to the memory manager 210. In one embodiment, the policy based storage characteristics are automatically selected by memory pool policy manager 270 in response to application storage needs or requirements, as discussed above.

In response to the completion of the configuration parameter negotiation and receipt of any storage policies, memory manager 210 of publisher VM 202 allocates a portion of RAM to the memory pool managed by pool VM 250. In one embodiment, the allocation is of memory in a particular memory range, and this memory is not used for other purposes by the publisher server. In one embodiment, the portion of RAM is exposed to pool VM 250, where pool VM 250 can access the portion of RAM as a block device (i.e., a device whose content is supplied from a remote device). In one embodiment, when pool VM 250 acts as a block device, pool VM 250 may read and write blocks of data directly from the portion of RAM exposed by publisher VM 202 on a corresponding publisher server. In another embodiment, pool VM 250 may read and write blocks of data from a local memory of a pool server (not shown), and then utilize the portion of memory of a publisher server as a portion of an aggregated primary storage. In either embodiment, portions of RAM memory of the disparate server systems are collected by pool VM 250, to convert the portions of server RAM into a larger storage resource. Furthermore, the collected pool provides highly efficient memory access since RAM access latencies are extremely small when compared to spinning disc access times. Furthermore, use of the collected server rams ensures a high input/output rate per second beyond those provided by spinning disc memories.

In one embodiment, configuration negotiator 256 informs pool manager 260 of the successful addition of publisher VM 202 to the memory pool. Pool manager utilizes this notification to add publisher VM's 202 allocated amount, type, and class of memory to a pool of two or more allocated memories of publisher servers. Furthermore, pool manager 260 adds the newly allocated memory to a memory management table 264, or other memory management data structure, that pool manager 260 utilizes to track a location of blocks of memory with a pool, to ensure that data available in the pool is mirrored by pool VM 250, to manage redundancy of blocks of data, etc.

As discussed above, one or more applications (not shown) may then access pool VM 250 as a storage volume for storing virtual machine files, or other data files, and for processing data read and write operations. In one embodiment, an application may be a virtual machine executed by a pool server, or executed on another server communicatively coupled with the pool VM 250. In response to a read or write request from an application, memory manager 262 informs pool protocol message processor 258 to generate one or more of pool protocol request messages to be sent to one or more publisher VMs 202. As discussed above, the pool protocol request messages enable blocks of data to be written to the pool of publisher VMs. For example, pool protocol message processor could generate a request message to write one or more blocks of data to memory exposed by publisher VM 202.

A message, such as the one described above in FIG. 6A, would be transmitted to publisher VM 202, which would utilize message processor 208 to process the message by parsing the header's fields, and performing the corresponding action. In this example, the message processor 208 would inform memory manager 210 to write the blocks of data in the message's payload to a RAM, or other memory, of the publisher server executing the publisher VM 202. The message processor 208 of publisher VM 202 would generate a reply message, to notify pool VM 250 as to the success or failure of the write request.

In one embodiment, pool protocol message processor 258 analyzes the header of the reply message to enable pool manager 260 to update the memory management table. Furthermore, when an initial request message was a READ request, pool protocol message processor 258 extracts the payload from the message and passes it to the application via network interface 254.

In one embodiment, pool protocol message processor 258 receives read and write requests from application to the aggregated pool of memory generated by pool VM 250. Pool VM 250 provides the appearance of a single volume of memory accessible to the application, and in some embodiments serves the applications memory requests from local memory (similar to a cache memory). In one embodiment, only a subset of the application's files is maintained locally at a pool server executing the pool VM 250. The aggregated portions of memory exposed by publisher VMs from corresponding publisher servers enable storage of all of the application's files within the pooled memory. The availability of memory on multiple different servers also enables redundancy to ensure high availability and reliable access to the files.

Figure 3:
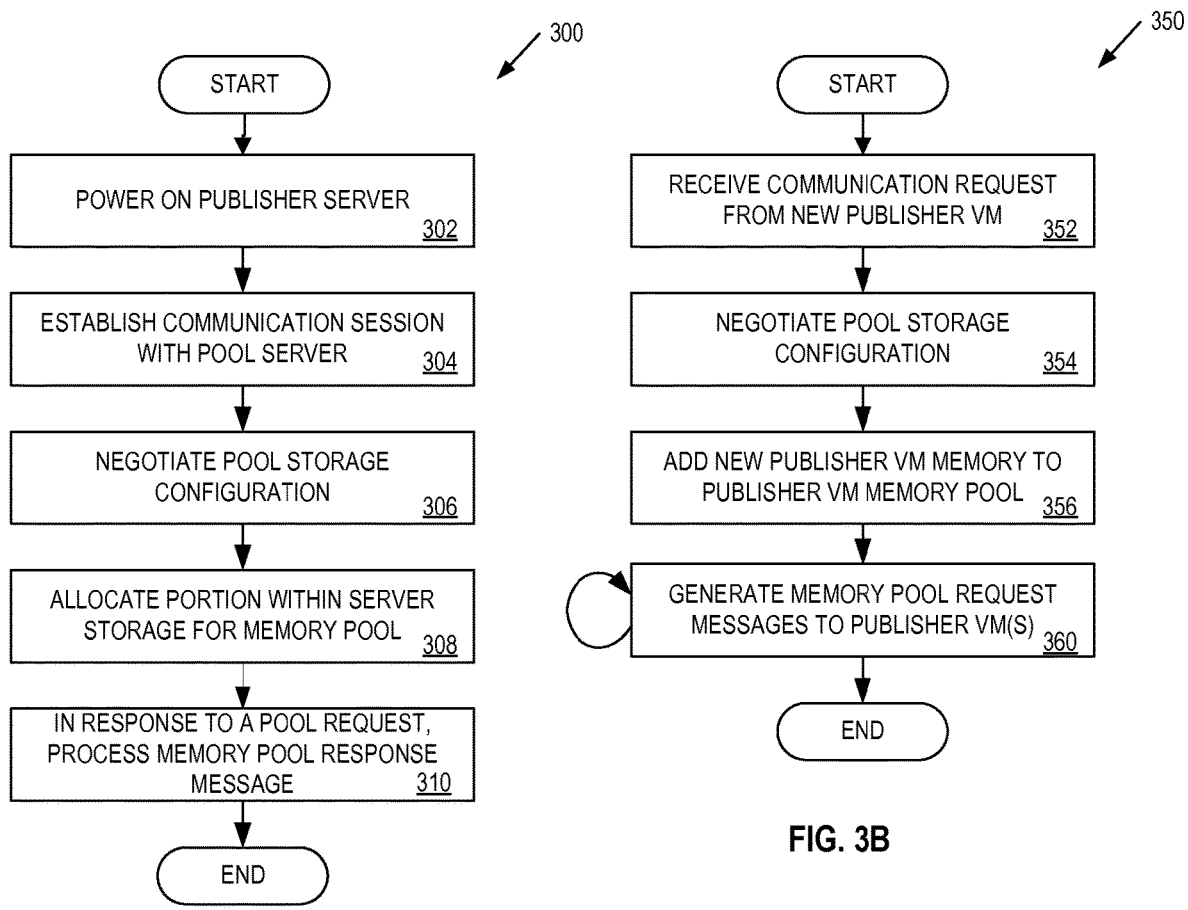
FIG. 3A is a flow diagram of one embodiment of a method for configuring a publisher virtual machine.
FIG. 3B is a flow diagram of one embodiment of a method for configuring a pool virtual machine.

FIG. 3A is a flow diagram of one embodiment of a method for configuring a publisher virtual machine. The method 300 is performed by processing logic that may comprise hardware (circuitry, dedicated logic, etc.), software (run on a general purpose computer system or a dedicated machine), firmware, or a combination. In one embodiment, the method 300 is performed by a publisher VM, such as publisher VMs 102-1 through 102-N and 202, described above with respect to FIG. 1 and FIG. 2.

Referring to FIG. 3A, the process begins by powering on a publisher VM (processing block 302). In one embodiment, the publisher VM is powered on as a server process, which is initiated when a server that executes the publisher VM is powered on. In another embodiment, the powering on occurs when the publisher VM is mounted, installed, and executed on a publisher server for the first time. In another embodiment, the powering on occurs when the publisher VM is coupled to a network.

Processing logic then established a communication session with a pool server (processing block 304). In one embodiment, the pool server is a network accessible device known, or discoverable, by the publisher VM. Once the communication session has been established, a pool storage configuration is negotiated between the publisher VM and the pool VM (processing block 306). The configuration parameters that are negotiated, in one embodiment, include an amount of storage to be allocated by publisher VM, for use in a pool of aggregated publisher VM memories, a type of memory to be added to a memory pool, and a class of memory to be added to a memory pool. In one embodiment, other configuration parameters could also be negotiated.

Processing logic then allocates a portion of server memory for the aggregated memory pool (processing block 308). In one embodiment, the amount of memory allocated corresponds to the negotiated amount from processing block 306 above.

In one embodiment, once the storage is allocated for a memory pool, the publisher VM can receive and respond to pool protocol memory request messages, such as requests to write data to the memory pool, requests to read data from the memory pool, requests to terminate a connection with a memory pool, and requests to flush pooled memory to storage.

Processing logic generates memory pool protocol reply messages in response to memory pool protocol request messages received from a pool VM (processing block 310). In one embodiment, the request messages could include requests to write blocks of data to the allocated memory, thereby storing the blocks of data into the publisher VMs portion of the aggregated pool of memory. Thus, the reply messages may then indicate a success of failure of the requested write operation. The request message may also be a read request message, in which processing logic would generate a reply that includes the requested block(s) of data. Additional types of pool protocol request messages may be processed by processing logic, whether specifically discussed or not.

FIG. 3B is a flow diagram of one embodiment of a method 350 for configuring a pool virtual machine. The method 350 is performed by processing logic that may comprise hardware (circuitry, dedicated logic, etc.), software (run on a general purpose computer system or a dedicated machine), firmware, or a combination. In one embodiment, the method 350 is performed by a pool VM, such as pool VM 152 and 250, described above with respect to FIG. 1 and FIG. 2.

Referring to FIG. 3B, the process begins by receiving a communication request from a new publisher VM (processing block 352). In one embodiment, the request from the new publisher VM is a request to join the pool, and thereby expose an amount of memory available at a publisher server to the pool. Processing logic negotiates pool storage configuration parameters (processing block 354). The configuration parameters include an amount of storage on a publisher server to be exposed by the publisher VM, a type of memory to be allocated, a class of service to be provided, as well as other parameters discussed herein. Processing logic adds the new publisher VM memory to a pool of memory aggregated from a plurality of disparate publisher servers and/or different memory types (processing block 356). The new publisher VM and memory provided by the publisher VM are tracked by the pool VM to enable the coordinated pooling of the aggregated memory. In one embodiment, the coordinated pooling by processing logic can combine the same type of memory, such as RAM or FLASH memory, from disparate publisher servers. In another embodiment, the coordinated pooling can pool different types/services of memory from disparate publisher servers. In either embodiment, different pools may be maintained by the pool VM to provide applications access to specific memories pools based on requirements of the application, type of service requested by an application, service guarantees requested by the application, etc.

Processing logic then generates memory pool request messages to one or more publisher VMs (processing block 360). The pool VM provides a virtualized storage volume to an application, such as a virtual machine application. The application can then store data to the virtualized storage volume, read data from the virtualized storage volume, etc. Furthermore, the virtualized storage volume may include a local storage that stores all or a portion of the application's files. Furthermore, blocks of data that represent these files are distributed among a pool of aggregated portions of memory exposed by publisher VMs executed by publisher servers. These blocks of data may be duplicated for redundancy purposes by the pool VM when distributed among publisher VMs.

Figures 4, 5:
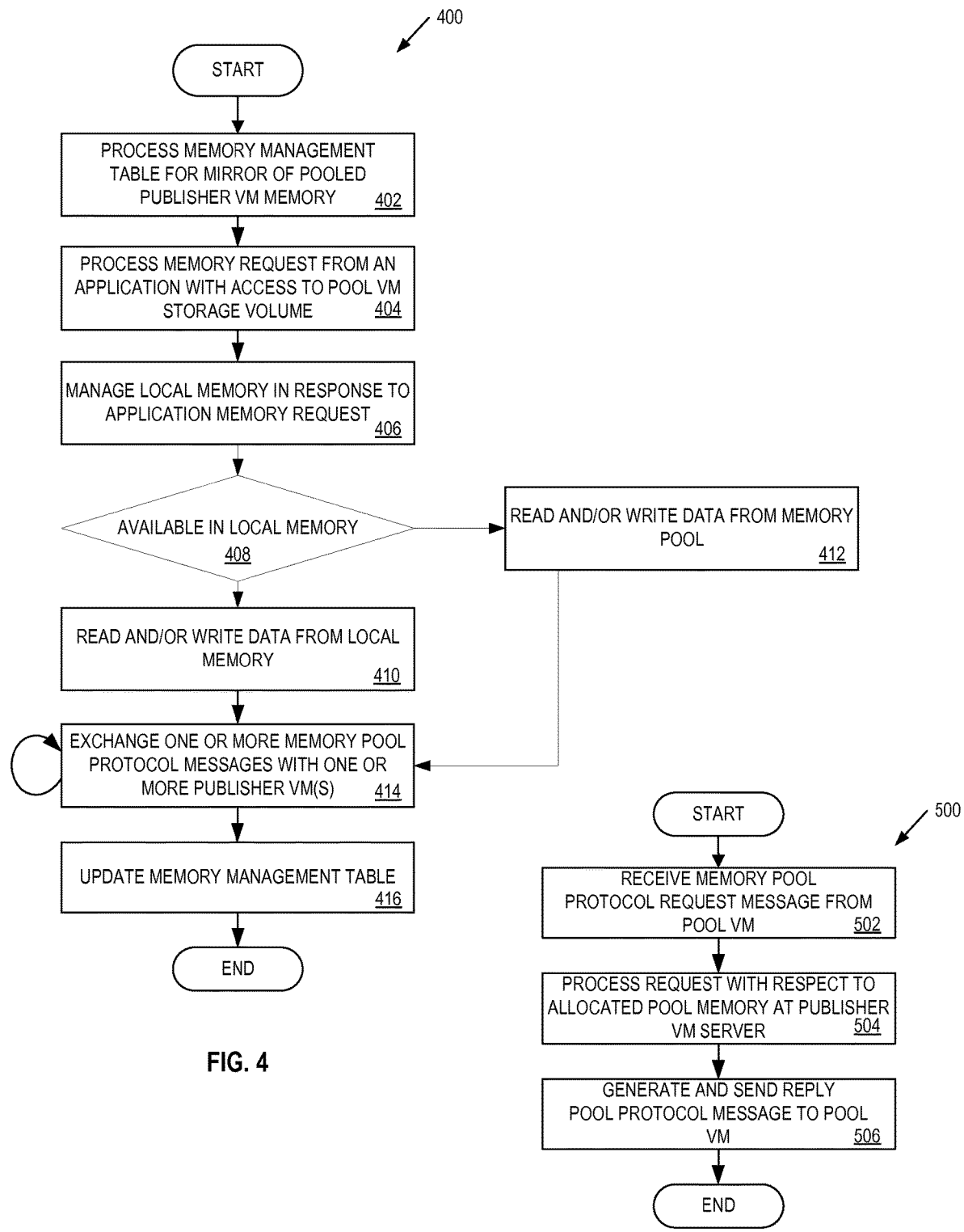
FIG. 4 is a flow diagram of one embodiment of a method for memory management and pool message processing by a pool virtual machine.
FIG. 5 is a flow diagram of one embodiment of a method for message handling by a publisher virtual machine.

FIG. 4 is a flow diagram of one embodiment of a method 400 for memory management and pool message processing by a pool virtual machine. The method 400 is performed by processing logic that may comprise hardware (circuitry, dedicated logic, etc.), software (run on a general purpose computer system or a dedicated machine), firmware, or a combination. In one embodiment, the method 350 is performed by a pool VM, such as pool VM 152 and 250, described above with respect to FIG. 1 and FIG. 2.

Referring to FIG. 4, the process begins by processing a memory management table to mirror pooled publisher VM memory (processing block 402). As discussed above, pool VM acts as a storage volume for an application, and the table is maintained by a pool VM to store data indicative of where data blocks are stored, how data is distributed within a pool for redundancy purposes, etc. Furthermore, the memory management table ensures that a pool VM maintains a mirror, of the blocks of memory stored by the disparate systems, memories, etc. of the memory pool.

Processing logic then processes memory requests from an application with access to the pool VM storage volume (processing block 404). The memory request could be a request to read data from, or write data to, the pool VM storage volume. For example, the application could be a virtual application that processes various files for a user, where the virtual application and files are stored by the pool VM storage volume and the memory pool.

Processing logic manages local memory in response to the application memory request (processing block 406). In one embodiment, processing logic determines whether the data which the subject of the application memory request is available from local memory or from pooled memory (processing block 408). When processing logic determines that the application's request can be handled from local memory, processing logic read blocks of data from, or write blocks of data to, local memory of a pool server similar to a cache memory (processing block 410). However, when processing logic determines that the applications request is to be handled from the pooled memory, processing logic utilize the pool of memory directly for reading or writing data (processing block 412), and only utilize local memory for maintaining and/or updating a data management data structure, such as the table generated in block 402.

Processing logic then exchanges one or more memory pool protocol messages with one or more publisher VM(s) (processing block 414). In one embodiment, processing logic periodically writes the locally stored data to one or more publisher servers as a writeback device by exchanging request and reply messages with corresponding publisher VMs, as discussed herein. That is, when changes occur to files of an application, those changes can be committed to a local memory, and the changes can then be distributed to one or more publisher VMs via the pool protocol messaging with publisher VMs discussed herein. Thus, an application's files are stored within a pool of aggregated memory at disparate publisher servers, and mirrored at a pool server. The memory management table maintained by a pool VM is then updated (processing block 416). The updating of the table ensures that the pool VM has an accurate record as to how blocks of data are distributed within a pool, how redundancy is being managed, etc.

FIG. 5 is a flow diagram of one embodiment of a method 500 for message handling by a publisher virtual machine. The method 500 is performed by processing logic that may comprise hardware (circuitry, dedicated logic, etc.), software (run on a general purpose computer system or a dedicated machine), firmware, or a combination. In one embodiment, the method 500 is performed by a publisher VM, such as publisher VMs 102-1 through 102-N and 202, described above with respect to FIG. 1 and FIG. 2.

Referring to FIG. 5, the process begins by receiving a memory pool protocol request message from a pool VM (processing block 502). Embodiments of the configuration and generation of pool protocol request messages are discussed above. The request is processed by a publisher VM with respect to allocated pool memory at a publisher server (processing block 504). In the embodiments, discussed herein, the request could be requests to access publisher server memory by reading data from, or writing data to, the publisher server's memory. Furthermore, the memory request is processed with respect to a portion of the publisher server's memory that has been allocated to a virtualized pool of memory. Processing logic generates and sends the appropriate response as a pool protocol reply message to the pool VM (processing block 506). Such reply messages can include requested blocks of data, an acknowledgement that a data write was successful, a failure message, etc.

In this way, the system provides a pool server to aggregate unused allocated memory in a plurality of publisher virtual machines, that can be different sizes and formats. The aggregate memory becomes a memory pool available for storage as random access memory to one or more applications.

Figure 7:
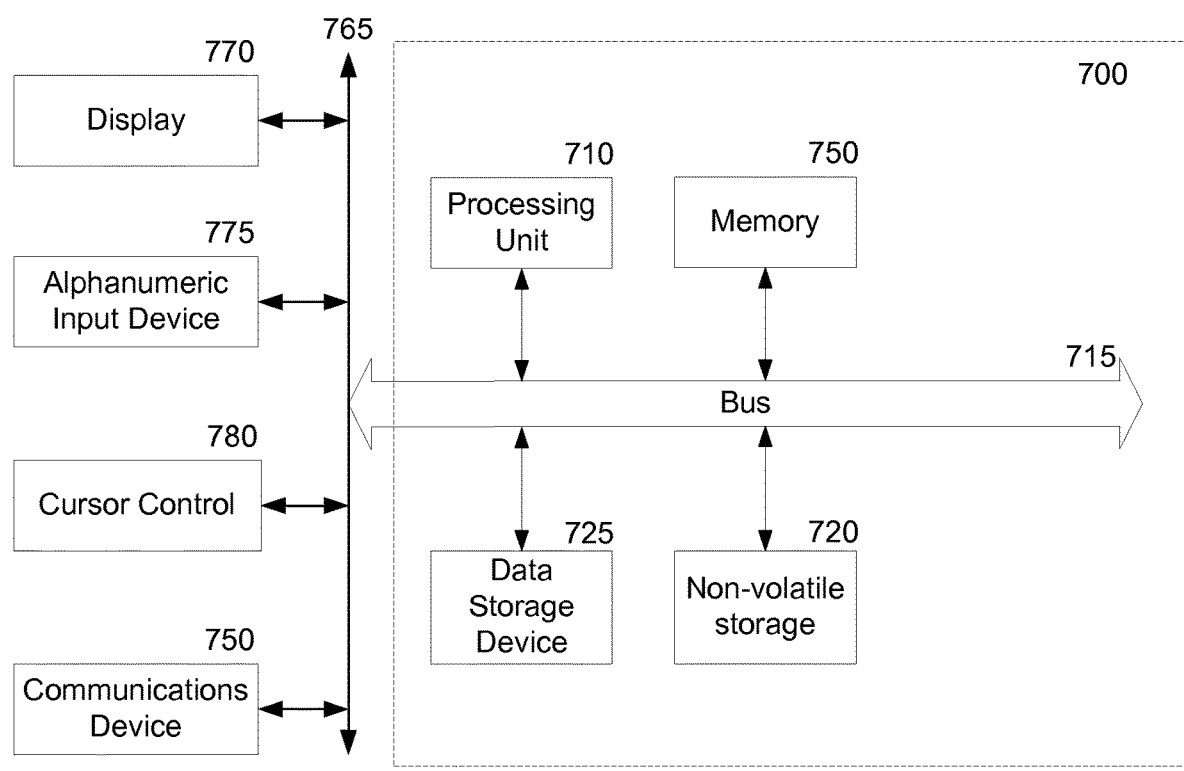
FIG. 7 illustrates an example schematic drawing of a computer network infrastructure.

FIG. 7 is one embodiment of a computer system that may be used with the present invention. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a cathode ray tube (CRT) or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 770 for accessing other nodes of a distributed system via a network. The communication device 770 may include any of a number of commercially available networking peripheral devices such as those used for coupling to an Ethernet, token ring, Internet, or wide area network. The communication device 770 may further be a null-modem connection, or any other mechanism that provides connectivity between the computer system 700 and the outside world. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

In the preceding description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "initiating", "transferring", "receiving", "creating", "obtaining", "writing", "determining", "updating", "adding", "associating", or the like, refer to the actions and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The processes and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:
1. A method, comprising:
    establishing communication between a pool virtual machine executing on a pool server and two or more publisher virtual machines executing on respective publisher servers;

aggregating, by the pool virtual machine, portions of memory from each of two or more publisher servers to generate a pool of memory, wherein each portion of memory from the two or more publisher servers are accessible to the pool virtual machine for the pool of memory and each portion is reserved from non-pool memory use by a corresponding publisher server at which the portion of memory is located, and wherein the portions of memory are heterogeneous in one or more of: size, type, and format, and the pool virtual machine aggregates a plurality of different pools of memory including the memory pool from at least the two or more publisher servers, wherein the plurality of different pools of memory comprise policy memory pools each having one or more storage characteristics comprising: a hybrid storage characteristic, a converged storage characteristic, a homogeneous storage characteristic, and a redundancy characteristic; and providing an application with access to a selected pool of memory, through the pool virtual machine, wherein the providing comprises:

receiving, by the pool virtual machine, a request for the application to access a memory pool, wherein the request specifies one or more characteristics of the application, and wherein the characteristics of the application comprise at least application type and application workload, selecting, by the pool virtual machine, a policy memory pool of the plurality of different pools of memory based at least in part on the application type and the application workload, and providing the application access to the selected policy memory pool.

2. The method of claim 1, wherein the two or more publisher servers comprise a first publisher server and a second publisher server, wherein a portion of memory of the first publisher server and a portion of memory of the second publisher server aggregated into the selected pool of memory are different types of memory.

3. The method of claim 2, wherein a pool server executing the pool virtual machine, the first publisher server, and the second publisher server are different servers communicatively coupled over a local area network.

4. The method of claim 1, wherein the selected pool of memory is accessible to the application as a network addressable storage volume, and wherein providing the application with access to the selected pool of memory further comprises:

receiving a data access request by the pool virtual machine from the application to access the network addressable storage volume;

determining a particular publisher virtual machine that stores data in the data access request;

transmitting a request message to the particular publisher server by the pool virtual machine based on the data access request; and receiving a reply message at the pool virtual machine from a publisher virtual machine executed by the particular publisher server generated in response to the request message.

5. The method of claim 4, wherein the data access request is a request to read one or more blocks of data, and the reply message contains the requested one or more blocks of data.

6. The method of claim 4, wherein the data access request is a request to write one or more blocks of data to storage, the request message to the particular publisher server by the pool virtual machine comprises the one or more blocks of data, and the reply message contains an acknowledgement that the one or more blocks of data have been stored in a portion of memory at a publisher server that has been allocated to the memory pool.

7. The method of claim 4, wherein the pool virtual machine executes a client process to generate the request message, and the publisher virtual machine executed by the particular publisher server executes a server process to generate the reply message.

8. The method of claim 4, wherein the request message comprises a request message header portion and a request message body portion, the request message header portion comprises a request message signaling identifier field, a message type field, a request message handle field, an offset field, and a length field, and the request message body portion comprises an optional message payload containing an amount of data specified in the length field, and wherein the reply message comprises a reply message header portion and a reply message body portion, the reply message header portion comprises a reply message signaling identifier, a reply message error code field, and a reply message handle field with a value corresponding to a value in the request message handle field, and the reply message body portion comprises an optional message payload containing an amount of data specified in the length field of the request message header.

9. The method of claim 1, wherein portions of random access memory (RAM) are aggregated, by the pool virtual machine, from each of the two or more publisher servers.

10. The method of claim 1, wherein the pool virtual machine is executed on a pool server and the two or more publisher virtual machines are executed on corresponding two or more publisher servers.

11. The method of claim 1, further comprising:
maintaining, by the pool virtual machine, a mirror of the aggregated portions of memory from each of two or more publisher servers.

12. The method of claim 11, further comprising:
generating a memory management table by the pool virtual machine that describes which publisher virtual machine stores which data.

13. The method of claim 1, further comprising:
establishing an initial connection between the pool virtual machine and a new publisher virtual machine; and
in response to the initial connection, the pool virtual machine and the new publisher virtual machine negotiating a set of configuration parameters for the addition of a new portion of memory provided by the new publisher virtual machine to the aggregated portions of memory.

14. The method of claim 13, wherein the set of configuration parameters comprise one or more of a size of the new portion of memory, a type of the new portion of memory, and a class of the new type of memory to be allocated by the new publisher virtual machine for the selected pool of memory.

15. The method of claim 1, wherein the pool virtual machine is a network block device that accesses blocks of application data, in response to application data read and write requests, directly from the selected pool of memory.

16. The method of claim 1, wherein the pool virtual machine is a network block device that accesses blocks of application data, in response to application data read and write requests, from a local memory, and commits blocks of data stored in the local memory to the selected pool of memory on a periodic basis.

17. The method of claim 1, wherein selecting, by the pool virtual machine, the policy memory pool based at least in part on the application type and the application workload further comprises:
  selecting, by the pool virtual machine, an existing pool of memory from the plurality of different pools for the application when storage characteristics of the existing pool of memory satisfy storage requirements for applications having the application type and the application workload; and
  when none of the plurality of different pools of memory have storage characteristics that satisfy the storage requirements for applications having the application type and the application workload, aggregating, by the pool virtual machine, a new pool of memory from memory of at least one of the two or more publisher servers, wherein storage characteristics of the new pool of memory satisfy the storage requirements for applications having the application type and the application workload, and wherein the new pool of memory is selected for the application.

18. A non-transitory computer readable storage medium including instructions that, when executed by a processor, cause the processor to perform a method comprising:
  establishing communication between a pool virtual machine executing on a pool server and two or more publisher virtual machines executing on respective publisher servers;
  aggregating, by the pool virtual machine, portions of memory from each of two or more publisher servers to generate a pool of memory, wherein each portion of memory from the two or more publisher servers are accessible to the pool virtual machine for the pool of memory and each portion is reserved from non-pool memory use by a corresponding publisher server at which the portion of memory is located, and wherein the portions of memory are heterogeneous in one or more of: size, type, and format, and the pool virtual machine aggregates a plurality of different pools of memory including the memory pool from at least the two or more publisher servers, wherein the plurality of different pools of memory comprise policy memory pools each having one or more storage characteristics comprising: a hybrid storage characteristic, a converged storage characteristic, a homogeneous storage characteristic, and a redundancy characteristic; and
  providing an application with access to a selected pool of memory, through the pool virtual machine, wherein the providing comprises:
    receiving, by the pool virtual machine, a request for the application to access a memory pool, wherein the request specifies one or more characteristics of the application, and wherein the characteristics of the application comprise at least application type and application workload,
    selecting, by the pool virtual machine, a policy memory pool of the plurality of different pools of memory based at least in part on the application type and the application workload, and
    providing the application access to the selected policy memory pool.

19. The non-transitory computer readable storage medium of claim 18, wherein the two or more publisher servers comprise a first publisher server and a second publisher server, wherein a portion of memory of the first publisher server and a portion of memory of the second publisher server aggregated into the selected pool of memory are different types of memory.

20. The non-transitory computer readable storage medium of claim 19, wherein a pool server executing the pool virtual machine, the first publisher server, and the second publisher server are different servers communicatively coupled over a local area network.

21. The non-transitory computer readable storage medium of claim 18, wherein the selected pool of memory is accessible to the application as a network addressable storage volume, and wherein providing the application with access to the selected pool of memory further comprises:
  receiving a data access request by the pool virtual machine from the application to access the network addressable storage volume;
  determining a particular publisher virtual machine that stores data in the data access request;
  transmitting a request message to the particular publisher server by the pool virtual machine based on the data access request; and
  receiving a reply message at the pool virtual machine from a publisher virtual machine executed by the particular publisher server generated in response to the request message.

22. The non-transitory computer readable storage medium of claim 18, wherein portions of random access memory (RAM) are aggregated, by the pool virtual machine, from each of the two or more publisher servers.

23. A system, comprising:
  a memory; and
  a processor coupled with the memory to
  establish communication between a pool virtual machine executing on a pool server and two or more publisher virtual machines executing on respective publisher servers,
  aggregate, by the pool virtual machine, portions of memory from each of two or more publisher servers to generate a pool of memory, wherein each portion of memory from the two or more publisher servers are accessible to the pool virtual machine for the pool of memory and each portion is reserved from non-pool memory use by a corresponding publisher server at which the portion of memory is located, and wherein the portions of memory are heterogeneous in one or more of: size, type, and format, and the pool virtual machine aggregates a plurality of different pools of memory including the memory pool from at least the two or more publisher servers, wherein the plurality of different pools of memory comprise policy memory pools each having one or more storage characteristics comprising: a hybrid storage characteristic, a converged storage characteristic, a homogeneous storage characteristic, and a redundancy characteristic, and
  provide an application with access to a selected pool of memory, through the pool virtual machine, wherein the processor to provide comprises the processor to:
    receive, by the pool virtual machine, a request for the application to access a memory pool, wherein the request specifies one or more characteristics of the application, and wherein the characteristics of the application comprise at least application type and application workload,
    select, by the pool virtual machine, a policy memory pool of the plurality of different pools of memory based at least in part on the application type and the application workload, and provide the application access to the selected policy memory pool.

\* \* \* \* \*